United States Patent
Schnitman

(10) Patent No.: US 8,645,336 B2
(45) Date of Patent: Feb. 4, 2014

(54) DIGITAL INTERACTIVE PHRASING SYSTEM AND METHOD

(75) Inventor: Myles J. Schnitman, Rancho Santa Fe, CA (US)

(73) Assignee: Magnaforte, LLC, San Diego, CA (US)

( * ) Notice: Subject to any disclaimer, the term of this patent is extended or adjusted under 35 U.S.C. 154(b) by 415 days.

(21) Appl. No.: 11/723,503

(22) Filed: Mar. 20, 2007

(65) Prior Publication Data

US 2007/0239754 A1 Oct. 11, 2007

Related U.S. Application Data

(63) Continuation-in-part of application No. 10/704,314, filed on Nov. 7, 2003, now abandoned.

(51) Int. Cl.
*G06F 17/00* (2006.01)

(52) U.S. Cl.
USPC ............ 707/693; 707/796; 709/205; 709/231

(58) Field of Classification Search
USPC .................................................. 709/205, 231
See application file for complete search history.

(56) References Cited

U.S. PATENT DOCUMENTS

| | | | |
|---|---|---|---|
| 5,151,998 A | 9/1992 | Capps | |
| 6,008,848 A * | 12/1999 | Tiwari et al. | 375/240.12 |
| 6,686,970 B1 | 2/2004 | Windle | |
| 6,898,637 B2 | 5/2005 | Curtin | |
| 7,437,055 B2 * | 10/2008 | Hamada et al. | 386/241 |
| 2001/0042048 A1 | 11/2001 | Boykin et al. | |
| 2002/0083346 A1 | 6/2002 | Rowlands | |
| 2002/0120925 A1* | 8/2002 | Logan | 725/9 |
| 2002/0161579 A1* | 10/2002 | Saindon et al. | 704/235 |
| 2004/0069123 A1* | 4/2004 | Becker et al. | 84/612 |
| 2004/0112202 A1* | 6/2004 | Smith et al. | 84/609 |
| 2004/0209592 A1* | 10/2004 | Kirkeby et al. | 455/344 |
| 2005/0042591 A1* | 2/2005 | Bloom et al. | 434/307 A |
| 2010/0228774 A1* | 9/2010 | Riemers | 707/770 |

* cited by examiner

*Primary Examiner* — Shyue Jiunn Hwa

(74) *Attorney, Agent, or Firm* — Mintz Levin Cohn Ferris Glovsky and Popeo, P.C.

(57) ABSTRACT

A digital interactive phrasing (DIP) system allows listeners to select and edit digitally prepared elements, such as audio or video clips, in any arrangement to create a custom mix. The elements may be reused to make new, different arrangements, as desired by the listener. The system allows the selection, assembly and playback of created sequences of elements, such as songs, verses, dialogs and video elements.

3 Claims, No Drawings

DIGITAL INTERACTIVE PHRASING SYSTEM AND METHOD

CROSS REFERENCE TO RELATED APPLICATIONS

This application is a continuation-in-part application of U.S. patent application Ser. No. 10/704,314, filed Nov. 7, 2003.

BACK GROUND OF THE INVENTION

The proliferation of computers and the Internet have changed the way average consumers buy, store and listen to music. It is no longer necessary to buy complete albums or to have songs stored on medium such as CDs. It is possible to download songs from the Internet and store them digitally on devices such as MP3 players.

The digital storage of songs allows listeners to store individual songs from various artists together. Without being confined to CDs having a specific song order, users are free to create different song orders from the catalog of songs stored on the MP3 player.

Greater freedom in digitally stored songs have allowed the average person to mix together phrases of songs. While this amount of interaction by listeners with songs if desirable, it is often time consuming and beyond the abilities of an average listener.

As the music industry has embraced the new matter in which songs are distributed and sold to the ultimate consumer, piracy and unauthorized copying of songs has long been a concern. The technology of making such transfer of songs possible also increases the ease in which copyright infringement occurs. A secure format preventing piracy would be welcomed by the music industry.

It is an object of the invention to provide listeners with a system and method for allowing interaction with commercially recorded music.

It is another object of the invention to provide a method for listeners to assemble audio and visual clips in any manner, being able to reuse clips in different arrangements.

It is still another object of the invention to empower a user will limited musical and computer skills to create blends of two or more musical tracks.

These and other objects of the invention will become apparent to one of ordinary skill in the art after reading the disclosure of the invention.

SUMMARY OF THE INVENTION

A digital interactive phrasing (DIP) system allows listeners to select and edit digitally prepared elements, such as audio or video clips, in any arrangement to create a custom mix. The elements may be reused to make new, different arrangements, as desired by the listener. The system allows the selection, assembly and playback of created sequences of elements, such as songs, verses, dialogs and video elements.

DETAILED DESCRIPTION OF THE INVENTION

Original source material is divided into pre-edited, digitally prepared elements arranged in a coded sequence. The elements are stored in memory, such as a computer hard drive or a removable storage device such as a CD, for future reassembly. The elements have a file main portion with a tag at the beginning and ending. The tag allows the central processing unit to identify the beginning and end of each element so elements may be mixed together.

A computer accesses the elements from the databases where they are stored. Each element can be mixed with other elements in the DIP format. The tag locates a point at which one element is spliced with another element. The splice may be a fade where the first element is faded out while the second element is faded in. The splice may also be a seamless transition. Any variety of transition affects can be used and included in the preparation and editing of the element.

In one simple application, a listener is able to mix studio and live versions of a song from one artist. However, it is not unusual for a single form to be recorded by different artists at different times. Using the system, different versions of the same song may be woven together to create a hybrid. Likewise, a medley of different songs by the same or different artists can be woven together to create an entirely new song.

A musical phrase or verse is segmented into audio phrases and assigned codes. The visual interpretation of how phrases are digitally stored are shown in the following Tables:

TABLE I

| Ver A | Ver B | Ver C | Pre-edited Phrases |
|---|---|---|---|
| A1 | B1 | C1 | Yesterday |
| A2 | B2 | C2 | All my troubles seem so far away |
| A3 | B3 | C3 | Now looks as though they are here to stay |

TABLE II

| Ver A | Ver B | Ver C | Pre-edited Phrases |
|---|---|---|---|
| A1 | B2 | n/a | Yesterday |
| A2 | B2 | C2 | Random Verse 1 |
| A3 | B3 | n/a | Now looks as though they are here to stay |
| A4 | B4 | C4 | Random Verse 2 |
| A5 | B5 | n/a | Oh I believe, in Yesterday |

TABLE III

| Ver A | Ver B | Ver C | Pre-edited Phrases |
|---|---|---|---|
| A1 | B2 | n/a | Yesterday |
| A2 | B2 | C2 | TV Clip 1 |
| A3 | B3 | n/a | Now looks as though they are here to stay |
| A4 | B4 | C4 | TV Clip 2 |
| A5 | B5 | n/a | Oh I believe, in Yesterday |

Table I illustrates the simple scenario of mixing different version of the same song. The user can easily mix the phrases from the different versions to create a new song. For instance, the use can make a version that is A1 B2 A3 or C1 A2 B3, and continuing to pick versions of each phrase until the song is complete. By having the phrases preset, the user can quickly and easily string the phrases together, without needing to determine where each phrase should begin and end. Each song would have its own alphanumeric code so as to be enable users to quickly find songs.

Table II exemplifies the mixing of disparate songs. Again the user is able to string together various phrases of different songs to create an entirely new song. The songs may be combined based on their similar theme or subject matter or because they have the same rhythm, tempo or melody. This allows the combination of any number of songs or even the insertion of a few phrases into a song. In a similar situation, video clips can be added to songs, as depicted in Table III. The video clips, like the audio clips, are pre-edited and stored as a file main portion with a tag at the beginning and ending.

The invention allows the easy mixing of elements to create new versions of one songs or the conglomeration of different songs in any order the user desires. Every song or video is pre-edited into elements forming blocks that can be combined. Once the elements are chosen, a file can be created. The file may be the elements themselves or the codes for the elements. In the latter case, the computer reads the codes and retrieves the elements to play the file. The invention can be performed in a procedure as follows:

1) The user inserts two CDs into a suitable device, such as a DSP digital signal processor;
2) User selects two or more tracks to be mixed;
3) The device recognizes the title/artist/track selection from encoding on the CD;
4) The device creates a code file in the data base;
5) The user initiates playback of a track in it entirety while viewing the corresponding code on the consumer interface while pre-annotated elements are being played;
6) User repeats the above step for the second (and each additional) track;
7) The user selects sequence of alternating selective playback by pushing buttons corresponding to codes (ie. A1 B2 B3 etc.)
8) User initiates selective playback by pressing a "Blend" button;
9) User preserves mix by pressing a "File" button to create file with artist/track date stamped and the corresponding selected codes;
10) User listens to selective alternating playback sequence or pre-annotated elements while viewing associated codes on consumer interface (LCD);
11) Option of pressing a "Random" button to create random mix of two tracks;
12) Save random mix as in step 9
13) Listen to random mix as in step 10
14) Equipment may have remote control
15) May mix tracks from same CD.

While the invention has been described with reference to preferred embodiments, variations and modifications would be apparent to one of ordinary skill in the art without departing from the spirit of the invention. The invention encompasses such variations and modifications.

I claim:

1. A computer-implemented method of creating mixed digital audio, the method comprising:
    loading source audio material into a database connected with the computer, wherein the source audio material comprises a song;
    editing, using the computer, the source audio material in the database to create a plurality of pre-edited elements, wherein each musical phrase or verse of the source audio material is segmented into one or more pre-edited elements by the computer based on encoding data on the source audio material;
    assigning, by the computer, each element a code, the code designating a version, from a plurality of versions, of each audio element of the plurality of elements;
    receiving a user-selected sequence or random sequence by the computer;
    combining, by the computer, a selection of the plurality of elements in a digital media file based on the user-selected sequence or random sequence of the codes associated with the plurality of elements, the digital audio file being playable to a user by the computer; and
    storing the digital media file on a removable disk storage medium for being playable to a user on other computers,
    wherein each element comprises a file main portion having a tag at the beginning and ending thereof,
    wherein the source audio material comprises commercially recorded music,
    wherein the encoding data indicates the title/artist/track selection of the source audio material,
    wherein the computer determines where each element begins and ends such that each element is a preset phrase, and
    wherein the computer creates a number of elements for each song, the number corresponding to the number of audio phrases the computer determines the song to have, independent of the version of the song.

2. The computer-implemented method of claim 1, further comprising storing the file in the database as new source material.

3. The computer-implemented method of claim 2, wherein the new source material comprises audio.

* * * * *